US012771528B2

(12) United States Patent
Aelmans et al.

(10) Patent No.: US 12,771,528 B2
(45) Date of Patent: Oct. 20, 2026

(54) KEY REQUEST MANAGEMENT

(71) Applicant: Juniper Networks, Inc., Sunnyvale, CA (US)

(72) Inventors: Melchior Dirk Frederik Aelmans, Voorschoten (NL); Gert Grammel, Ditzingen (DE); Sabyasachi Mukhopadhyay, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 120 days.

(21) Appl. No.: 18/522,814

(22) Filed: Nov. 29, 2023

(65) Prior Publication Data

US 2025/0175324 A1 May 29, 2025

(51) Int. Cl.
*H04L 9/08* (2006.01)

(52) U.S. Cl.
CPC .......... *H04L 9/0822* (2013.01); *H04L 9/0838* (2013.01); *H04L 9/0852* (2013.01)

(58) Field of Classification Search
CPC .................. H04L 9/0838; H04L 9/0852–0858
See application file for complete search history.

(56) References Cited

U.S. PATENT DOCUMENTS

| | | | | |
|---|---|---|---|---|
| 7,515,716 | B1 * | 4/2009 | Elliott | H04L 9/0858 380/278 |
| 2014/0365786 | A1 * | 12/2014 | Tanizawa | G06F 21/602 713/193 |
| 2017/0324550 | A1 * | 11/2017 | Yuan | H04L 67/1097 |
| 2022/0173896 | A1 * | 6/2022 | Rahman | H04L 9/0827 |
| 2022/0294616 | A1 | 9/2022 | Parry et al. | |
| 2024/0372712 | A1 * | 11/2024 | Kovács | H04L 9/0852 |

OTHER PUBLICATIONS

"Quantum Key Distribution (QKD); Protocol and data format of REST-based key delivery API." ETSI GS QKD 014 V1.1.1, Feb. 2019, 22 pages.
"Recommendation for Block Cipher Modes of Operation: Galois/Counter Mode (GCM) and GMAC," NIST, National Institute of Standards and Technology, Nov. 2007, 39 pages.
"Validation of a Quantum Safe Macsec Implementation, Is ETSI-QKD REST-API fit for purpose?"Juniper Networks, Jul. 2022, 8 pages.
Extended European Search Report for European Application No. EP24153575 dated Jul. 29, 2024, 9 pages.
Quantum Key Distribution (QKD); Protocol and Data Format of REST-based Key Delivery API; ETSI GS QKD 014 V0.0.3 (Dec. 2018). Retrieved from the Internet: URL: https://docbox.etsi.org/ISG/QKD/05-CONTRIBUTIONS/2018/QKD025018_Draft%20DGS_QKD-014KeyDeliv_v0_0_3/QKD-014KeyDelivv003.pdf [retrieved on Dec. 1, 2018].
Quantum Key Distribution (QKD); Protocol and Data Format of REST-based Key Delivery API, ETSI GS QKD 014 V0.0.5 (Jan. 2019), Retrieved from the Internet: URL: http://www.docbox.etsi.org/ISG/QKD/05-CONTRIBUTIO%20NS/2019/QKD000003Draft%20DGS_QKD-014KeyDeliv_v0_0_5.docx.

* cited by examiner

*Primary Examiner* — Daniel B Potratz
(74) *Attorney, Agent, or Firm* — Harrity & Harrity, LLP

(57) ABSTRACT

In some implementations, a network device may transmit a key request and a proposed key request rate associated with the key request. The network device may receive a response to the key request based on the proposed key request rate. In some implementations, a network device may transmit a key request. The network device may receive a response to the key request that includes a key-derived key or an indication of a time associated with another key request.

20 Claims, 8 Drawing Sheets

KEY REQUEST MANAGEMENT

BACKGROUND

Network devices can communicate securely with each other using one or more keys (e.g., random or pseudorandom numbers). For example, network devices can apply data to a cryptographic process using the key(s) to encode or decode the data. For example, a first network device may convert plaintext to ciphertext using a key and transmit the ciphertext to a second network device. Upon receiving the ciphertext, the second network device may convert the ciphertext data back to plaintext data using a key.

SUMMARY

Some implementations described herein relate to a method. The method may include transmitting, by a network device, a key request and a proposed key request rate associated with the key request. The method may include receiving, by the network device, a response to the key request based on the proposed key request rate.

Some implementations described herein relate to a network device. The network device may include one or more memories and one or more processors. The one or more processors may be to transmit a key request. The one or more processors may be to receive a response to the key request that includes a key-derived key or an indication of a time associated with another key request.

Some implementations described herein relate to a non-transitory computer-readable medium that stores a set of instructions. The set of instructions, when executed by one or more processors of a network device, may cause the network device to transmit a quantum key distribution (QKD) key request and a proposed QKD key request rate associated with the QKD key request. The set of instructions, when executed by one or more processors of the network device, may cause the network device to receive a response to the QKD key request based on the proposed QKD key request rate.

DETAILED DESCRIPTION

Figure 1:
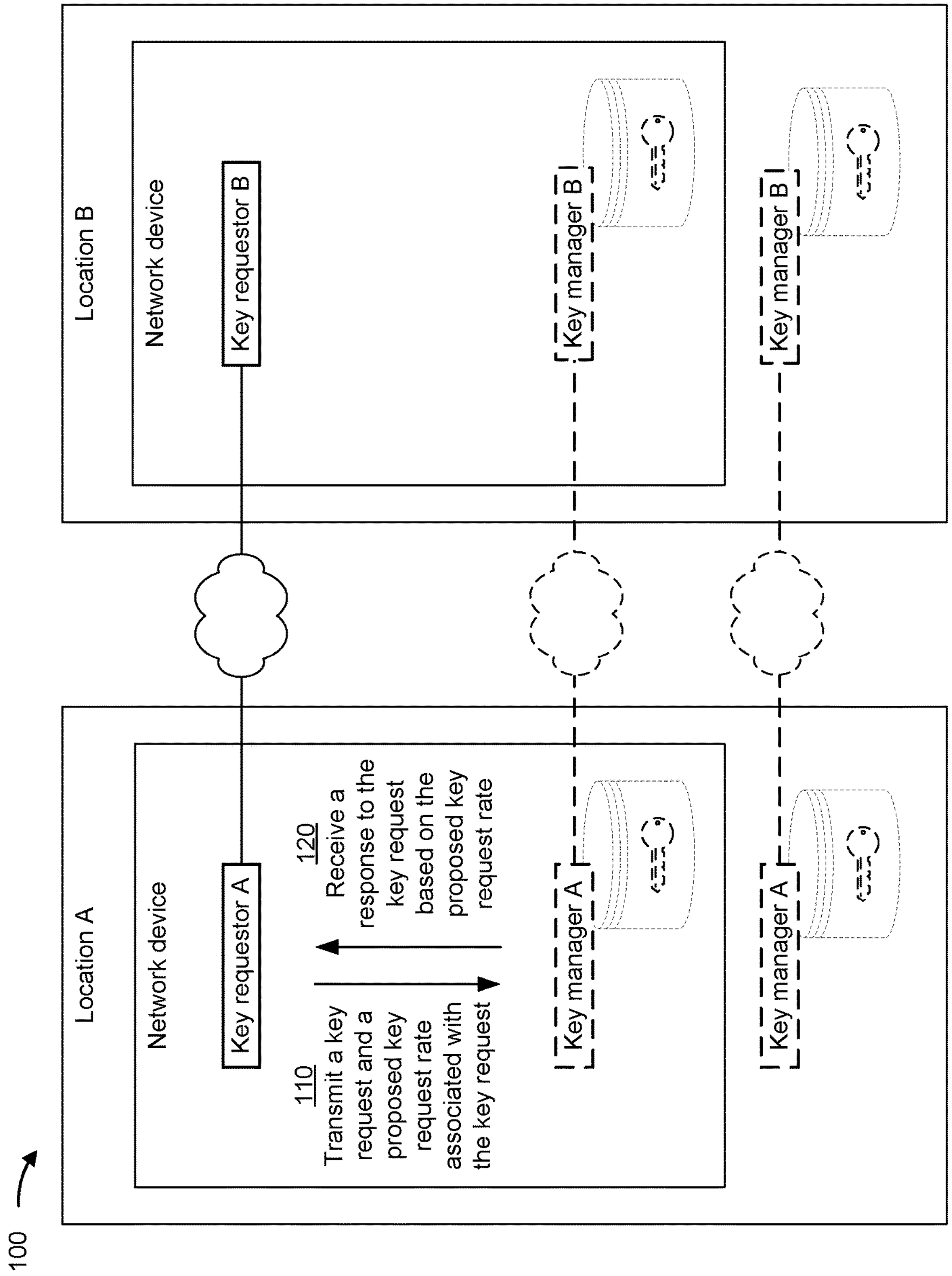
FIG. 1 is a diagram of an example implementation associated with transmission of a proposed key request rate.

The following detailed description of example implementations refers to the accompanying drawings. The same reference numbers in different drawings may identify the same or similar elements.

A network device (e.g., a router, firewall, or other consumer of key material) may include a key requestor component that requests a key from a key manager. In response to the request, the key manager may generate the key based on key material (e.g., one or more numbers) and provide the key to the key requestor. The network device may use the generated key to communicate securely with another network device. In some examples, the network device may use QKD to determine a same key at two ends of a quantum link that is considered information-secure since the key is never transmitted over the quantum link. In QKD, the key requestor may be referred to as a secure application entity (SAE), and the key manager may be a key management entity (KME). An SAE may be an entity that requests one or more keys from a KME for one or more applications running in cooperation with one or more other SAEs. A KME may be an entity that manages keys in a network in cooperation with one or more other KMEs. A KME may serve one or more SAEs.

For example, a first SAE and a first KME may be connected and housed at a first location, and a second SAE and a second KME may be connected and housed at a second location. The first and second KMEs may be connected by a direct QKD link or a QKD network that includes multiple QKD links. Once generated, a key may be available at the first and second KMEs, and a unique key identifier (e.g., a universally unique key identifier) may be assigned to the key and shared among the first and second KMEs. The first SAE may transmit a request to the first KME for a key and a corresponding key identifier, and the first KME may provide the key and the key identifier to the first SAE. The first SAE may transmit the key identifier to the second SAE. The second SAE may request the key corresponding to the key identifier from the second KME, which may provide the key to the second SAE. In this manner, the SAEs may use the key identifier to identify a key pair (e.g., two independent instances of the same key) without explicitly sharing the key. The first and second SAE may establish a secure communication (e.g., a secure tunnel) using the key identified by the key identifier.

The key requestor may use an application programming interface (API) to retrieve the key and/or key identifier from the key manager. For example, KMEs and SAEs may leverage a QKD representational-state-transfer-based key delivery API to exchange key-related communications. For example, an SAE may actively request keys from a KME using the QKD representational-state-transfer-based key delivery API.

A key requestor may periodically request a new key from a key manager, which may help to ensure that communication between network devices remains secure. However, in certain situations, the key manager may be unable to serve, and can reject, a key request. For example, the key manager may be unable to serve a key request if the rate at which the key manager generates additional keys is outstripped by the frequency of key requests. For example, the frequency of key requests may be impacted by the amount of data to be delivered using keys supplied by the key manager, properties of a fiber over which the keys are exchanged, power outages, a quantity of key requestors that are requesting keys from the key manager, or the like. In some situations, the key manager may experience key shortages and, thus, be unable to delivery any keys (or key material) to the key requestor. Such key shortages may increase delay in data delivery, lead to unsecure data exchange, and/or occupy excessive bandwidth resources (e.g., due to message exchange during a slow key generation phase).

For example, if an SAE transmits a request for a key and a key identifier to a KME that lacks sufficient key material to generate a key (e.g., during a slow key generation phase), then the KME may return an error message. For example, the error message may have a hypertext transfer protocol (HTTP) status code 503, which may indicate that the error is on the server-side (e.g., on the KME-side). The SAE may repeatedly re-transmit the request for a key and a key identifier (and repeatedly receive the error message) until the KME obtains sufficient key material to generate a key. At that point, the KME may provide the key and key identifier to the SAE, which may use the key and key identifier to establish a secure communication with another SAE, as described above.

For example, a measurement-device-independent QKD (MDI-QKD) system may deliver two advanced encryption standard 256 (AES256) keys per minute. The amount of data that can be encrypted using a single key may be $len(P) \leq 2^{39}-256$ bits, where P is plaintext and len(P) is the length of P. Because $2^{39}$ bits is approximately equal to 68 gigabytes (GB), for a 300 Mbps connection, the key for a connection may need to be changed every thirty minutes on average to ensure that the encrypted data remains secure. As a result, the MDI-QKD system in this example can, on average, secure only sixty connections simultaneously. During peaks in demand, the MDI-QKD system may secure less than sixty connections simultaneously. For example, a burst of key requests can starve the KME of keys, rendering the KME unable to serve the SAE, which can lead to key request failure.

As a result, the SAE may perform an uncontrolled fall-back to key material that is less secure than a new key (e.g., the SAE may re-use the previous, unsecure key). Alternatively, if the SAE is not to use the less secure key material, then the SAE may lose traffic because no useable key is available, causing the connection between the SAEs to be terminated. Alternatively, the SAE may generate a key using a key derivation function, which lowers the security or integrity of the transmitted data.

Key material shortages, and the resulting security and/or connection issues described above, may arise for other types of keys (e.g., QKD keys, symmetric keys, or the like). For example, symmetric key delivery KMEs, which may also leverage the QKD representational-state-transfer-based key delivery API for key delivery, can also experience key material shortages.

Some implementations described herein enable a key requestor to selectively receive keys based on control by a key manager (e.g., a key management controller). In some aspects, the key requestor may transmit a proposed key request rate to a key manager and receive a response (e.g., an acceptance or a rejection) based on the proposed key request rate. For example, the proposed key request rate may allow for an uneven distribution of individual key requests over time. In some examples, the proposed key request rate may be a proposed key request pace. For example, the proposed key request pace may indicate a predicted length of time between individual key requests that the network device is to transmit to a key manager. In some examples, the key requestor may receive, from the key manager, a key-derived key in response to a key request. In some examples, the key requestor may receive, from the key manager, an indication of a time associated with another key request, in response to a key request. For example, the key manager may indicate a time at which the key requestor is to transmit the other key request.

As a result, the implementations described herein may mitigate the impact of lack of key material for generation of new keys. For example, receiving the response based on the propose key request rate may help to ensure that the key requestor reliably receives keys in response to a key request (e.g., by avoiding a lack of key material at the key manager), thereby enabling consistent, secure data exchange. Receiving the response based on the propose key request pace may enable the key manager to schedule key delivery (e.g., by caching a key before the key requestor sends a key request), thereby helping to ensure that a key will be available for the key requestor, even in the case of changing key demand at the key manager. Receiving the key-derived key from the key manager may enable the key manager to control a level of security of keys used by the key requestor, which may be more secure than relying on a particular implementation of the key requestor to determine the security of the key-derived keys. Receiving the indication of the time associated with the other key request may reduce overhead, such as bandwidth resources that would, absent the indication of the time associated with the other key request, be occupied with repeatedly transmitted key requests.

FIG. 1 is a diagram of an example implementation 100 associated with transmission of a proposed key request rate. As shown in FIG. 1, example implementation 100 includes two network devices, which are described in more detail below in connection with FIGS. 5-7. The network devices may be in respective locations (e.g., sites), namely location A and location B. The network devices may include respective key requestors, namely key requestor A and key requestor B. As shown, locations A and B may also include respective key managers, namely key manager A and key manager B. In some examples, one or more of the key managers may be physical devices that are separate from the network device. In some examples, one or more of the key managers may be logical devices (e.g., virtual machines) that are hosted on one or more of the network devices (e.g., a key manager may run on a key requestor). In some examples, the key requestors may be SAEs and the key managers may be KMEs.

In some aspects, the network device (e.g., an SAE of the network device) may receive an indication of a supported key request rate (e.g., supported QKD key request rate). For example, key requestor A may receive the indication of the supported key request rate from key manager A. The supported key request rate may be a rate (e.g., a maximum rate) at which the key manager A can generate keys for key requestor A. In some examples, the supported key request rate may be referred to as a "supported key request cadence." One or more indications of a supported key request rate may be transmitted before or after any suitable operation described herein.

In some examples, the network device may receive the indication of the supported key request rate in a status response (e.g., sent via a QKD representational-state-transfer-based key delivery API). For instance, the status response may respond to a "get status" message transmitted by the network device (e.g., via a QKD representational-state-transfer-based key delivery API). The status response may include an item, referred to as "max_key_request_cadence" and having an integer data type, that indicates the maximum quantity (e.g., number) of key requests that key manager A can support for key requestor A per unit of time (e.g., per minute).

As shown by reference number 110, the network device may transmit a key request (e.g., a QKD request) and a proposed key request rate (e.g., a proposed QKD request rate) associated with the key request. For example, key requestor A (e.g., an SAE of the network device) may transmit the key request and the proposed key request rate to key manager A. The network device may transmit the key request and the proposed key request rate in a single transmission or in multiple transmissions. In some examples, the proposed key request rate may indicate a predicted average length of time between key requests (e.g., including the key request) that the network device is to transmit to key manager A. For example, the proposed key request rate (e.g., as an average) may allow for an uneven distribution of individual key requests. The proposed key request rate may also be referred to as a "proposed key request cadence."

In some aspects, the proposed key request rate may be a proposed key request pace (e.g., a proposed QKD key request pace). In some examples, the proposed key request pace may indicate a predicted length of time between individual key requests (e.g., including the key request) that the network device is to transmit to key manager A. For example, the proposed key request pace may indicate that the individual key requests are distributed over time evenly (to within a given level of precision). For example, an SAE may predict that the SAE is to request a paced key periodically (e.g., every 30 seconds), and may inform the KME of this prediction. For example, the key request may have a data format that includes an extension parameter (e.g., an optional extension parameter, such as a KME key request optional extension) as follows:

```
"extension_optional": [
  {
    "key_pace": 30
}
```

In some examples, the proposed key request rate may be less than or equal to the supported key request rate. In some examples, the proposed key request rate may be greater than the supported key request rate. For example, the network device may request a proposed key request rate that may be greater than the supported key request rate if the network device did not receive the indication of the supported key request rate, or in case the supported key request rate has changed since the network device received the indication of the supported key request rate. In some examples, the network device may also receive an indication of a quantity of the future key requests and/or a time period for which the network device is to transmit the future key requests.

As shown by reference number 120, the network device may receive a response to the key request based on the proposed key request rate. For example, key requestor A may receive the response from key manager A. The response may be based on the proposed key request rate in that key manager A may determine whether key manager A can support (e.g., fulfill) the proposed key request rate (e.g., whether key manager A can generate keys fast enough to at least match the proposed key request rate) and transmit the response accordingly.

In some examples, the response may be a rejection of the key request. For instance, key manager A may reject the key request if the proposed key request rate is greater than the supported key request rate. In some examples, the response may be an acceptance of the key request. For instance, key manager A may accept the key request if the proposed key request rate is greater than the supported key request rate. If the response is an acceptance, then the network device (e.g., the key requestor A) may receive a key and/or corresponding key identifier from the key manager A. For example, the response may include the key and/or key identifier. The network device (e.g., key requestor A) may use the key and key identifier to establish a secure communication with the other network device (e.g., key requestor B). The key may be any suitable type of key, such as a QKD key, a symmetric key, or the like.

In some aspects, the rejection of the key request may be associated with an alarm. For example, if the key manager A cannot support the requested cadence (e.g., the proposed key request cadence), then the network device (e.g., key requestor A) and/or key manager A may generate an alarm. For example, the alarm may notify a network operator that the key request has been rejected and/or that the key manager A cannot support the proposed key request cadence.

The network operator may, in response to the alarm, take an action that enables the key manager A to support the key demand of the key requestor A. In some examples, the network operator may decrease a key request rate of the network device (e.g., the network operator may prolong the cadence on key requestor A). For example, the network operator may decrease the key request rate such that the key request rate is less than or equal to the supported key request rate. Additionally, or alternatively, the network device may automatically decrease the proposed key request rate. In some examples, the network operator may upgrade and/or scale key manager A. In some examples, the network operator may adjust a license, on key manager A, that limits the quantity of keys per unit of time that can be delivered from the key manager A. For example, the network operator may adjust the license to increase the quantity of keys per unit of time that can be delivered from key manager A.

In some aspects where the response is a rejection of the key request, the network device (e.g., an SAE of the network device) may transmit another proposed key request rate (e.g., another QKD proposed key request rate) that is less than or equal to the supported key request rate. In some examples, the network device may also transmit another key request. For example, key requestor A may transmit the other key request and/or the other proposed key request rate to key manager A.

In some aspects where the response is an acceptance of the key request, the network device (e.g., an SAE of the network device) may transmit another key request (e.g., another QKD key request) associated with the key request. In some aspects, the network device (e.g., an SAE of the network device) may also transmit another proposed key request rate (e.g., another proposed QKD key request rate) associated with the other key request. In some aspects, the network device (e.g., an SAE of the network device) may refrain from transmitting the proposed key request rate. The other key request may be associated with the key request in that the key request and the other key request may request keys for the same session. In some examples, the other proposed key request rate may include a predicted average length of time between key requests (e.g., including the other key request) that the network device is to transmit to key manager A. The value of the other proposed key request rate may be the same as, or different from, the proposed key request rate. For example, if the value of the other proposed key request rate is the same as the proposed key request rate, then the network device may refrain from transmitting the proposed key request rate. If the value of the other proposed key request rate is different from the proposed key request rate, then the network device may transmit the proposed key request rate.

In cases where the proposed key request rate is a proposed key request pace, key manager A may accept or reject the proposed key request pace. For example, key requestor A may receive an acceptance of the proposed key request pace or a rejection of the proposed key request pace. In some aspects (e.g., where the response is a rejection of the key request), the rejection of the key request may indicate that the rejection of the key request is based on the proposed key request pace. For example, the rejection may be an error message indicating that the key request has been rejected (e.g., because key manager A cannot support the proposed key request pace). The error message may include an attribute (e.g., in an array of objects) that indicates the reason for the error. For example, the attribute may indicate that key manager A cannot support the proposed key request pace (e.g., the error message may inform key requestor A regarding the cadence limits of key manager A).

Receiving the response to the key request based on the proposed key request rate may help to protect the key requestor from situations where the key manager has no available keys to provide in response to a key request (e.g., a subsequent key request). For example, the key manager may accept or reject the key request based on whether the key manager can support the proposed key request rate. As a result, the network device may participate in a secure data exchange with another network device using keys that are reliably, consistently provided by the key manager.

Receiving the indication of the supported key request rate may enable the network device to transmit, to the key manager, a proposed key request rate that the key manager can support. For example, the indication of the supported key request rate may enable the key requestor to avoid receiving a rejection from the key manager, which may reduce a delay involved in receiving a key in response to the key request.

Transmitting another proposed key request rate may enable the key requestor to dynamically adjust a proposed key request rate. For example, if a future key request rate of the key requestor is variable or unpredictable, then the other proposed key request rate may be a different value than the (previous) proposed key request rate. Refraining from transmitting another proposed key request rate may reduce bandwidth that would otherwise be occupied with carrying the other proposed key request rate. For example, if the future key request rate of the key requestor is steady or predictable, then the other proposed key request rate may be the same value as the (previous) proposed key request rate.

The proposed key request rate being a proposed key request pace may enable the key manager to prepare for, and/or schedule, key delivery for the key requestor. For example, the key manager may determine, using the proposed key request pace, an approximate time at which the key manger is to receive a key request. As a result, the key manager may cache a key created at any suitable time before the key manager is to receive the key request, thereby helping to ensure that a key will be delivered to the key requestor promptly in response to the key request. For example, if the proposed key request pace is 30 seconds, then the key manager may generate and cache the key for the key requestor any time before the 30 seconds expire.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
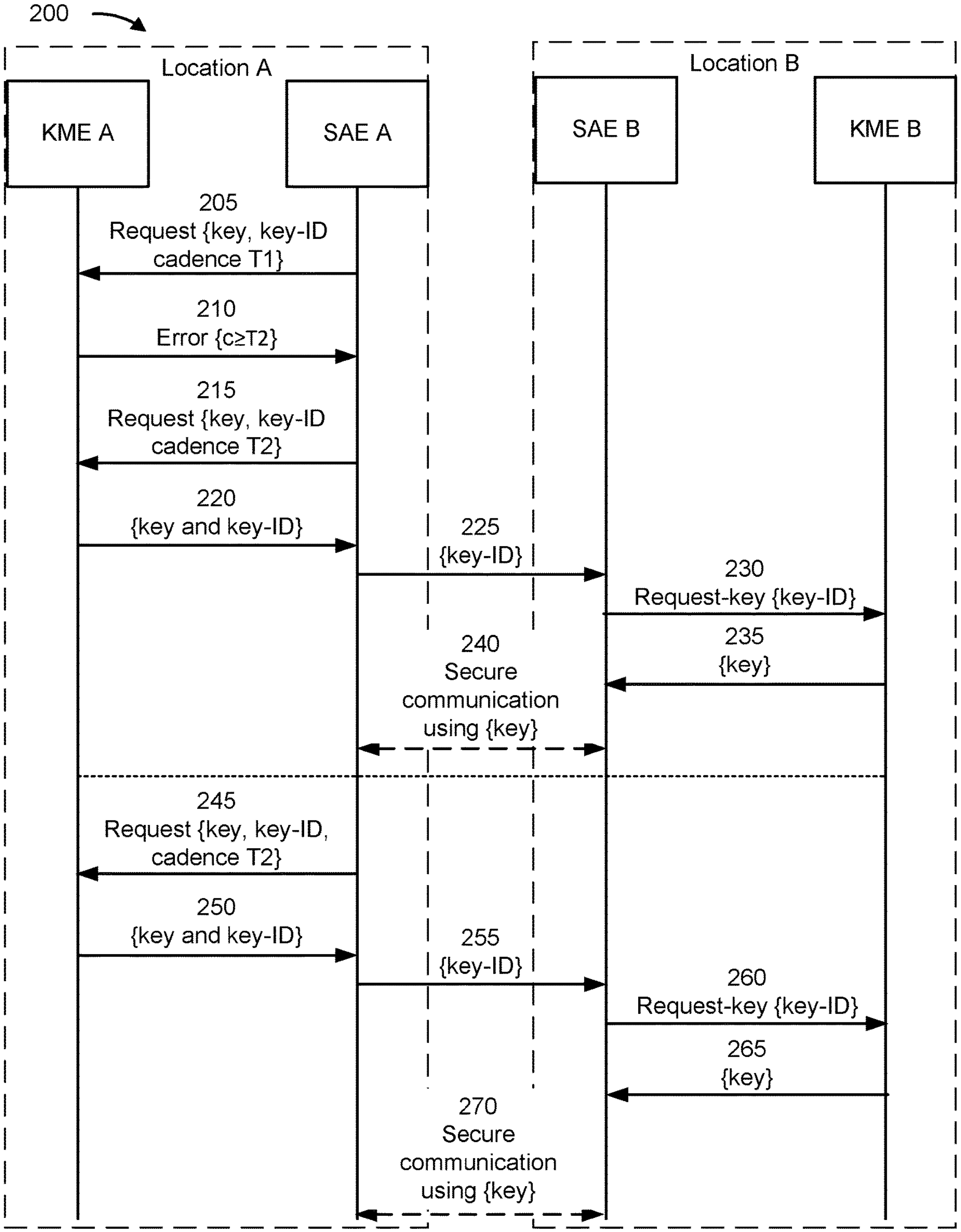
FIG. 2 is a diagram of an example process associated with a message exchange, including cadence information, during a slow key generation phase.

FIG. 2 is a diagram of an example process 200 associated with a message exchange, including cadence information, during a slow key generation phase. Operations 205-240 provide an example involving a rejection of a key request, and operations 245-270 provide an example that does not involve a rejection of a key request. The example involving operations 205-240 need not necessarily precede operations 245-270.

As noted, operations 205-240 provide an example involving a rejection of a key request. As shown by reference number 205, SAE A (e.g., key requestor A) may transmit, and KME A (e.g., key manager A) may receive, a request for a key and a key identifier of the key and an indication of a proposed key request cadence T1. T1 may be a proposed period of time between key requests. KME A may determine that the proposed key request cadence exceeds the key generation rate of KME A and, thus, reject the key request.

As shown by reference number 210, KME A may transmit, and SAE A may receive, an error message indicating that the proposed key request cadence is too frequent for the KME A to support. The error message may include an indication of a supported key request cadence. For example, the error message may indicate that a proposed key request cadence must be greater than or equal to T2 to be accepted.

As shown by reference number 215, SAE A may transmit, and KME A may receive, a request for a key and a key identifier of the key and an indication of a proposed key request cadence T2. KME A may determine that the proposed key request cadence matches the key generation rate of KME A and, thus, accept the key request.

As shown by reference number 220, KME A may transmit, and SAE A may receive, the key and key identifier. As shown by reference number 225, SAE A may transmit, and SAE B may receive, the key identifier. As shown by reference number 230, SAE B may transmit, and KME B may receive, a request for the key. The request for the key may include the key identifier. As shown by reference number 235, KME B may transmit, and SAE B may receive, the key. As shown by reference number 240, SAE A and SAE B may establish a secure communication using the key.

As noted, operations 245-270 provide an example that does not involve a rejection of a key request. As shown by reference number 245, SAE A may transmit, and KME A may receive, a request for a key and a key identifier of the key and an indication of a proposed key request cadence T2. KME A may determine that the proposed key request cadence matches the key generation rate of KME A and, thus, accept the key request.

As shown by reference number 250, KME A may transmit, and SAE A may receive, the key and key identifier. As shown by reference number 255, SAE A may transmit, and SAE B may receive, the key identifier. As shown by reference number 260, SAE B may transmit, and KME B may receive, a request for the key. The request for the key may include the key identifier. As shown by reference number 265, KME B may transmit, and SAE B may receive, the key. As shown by reference number 270, SAE A and SAE B may establish a secure communication using the key.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
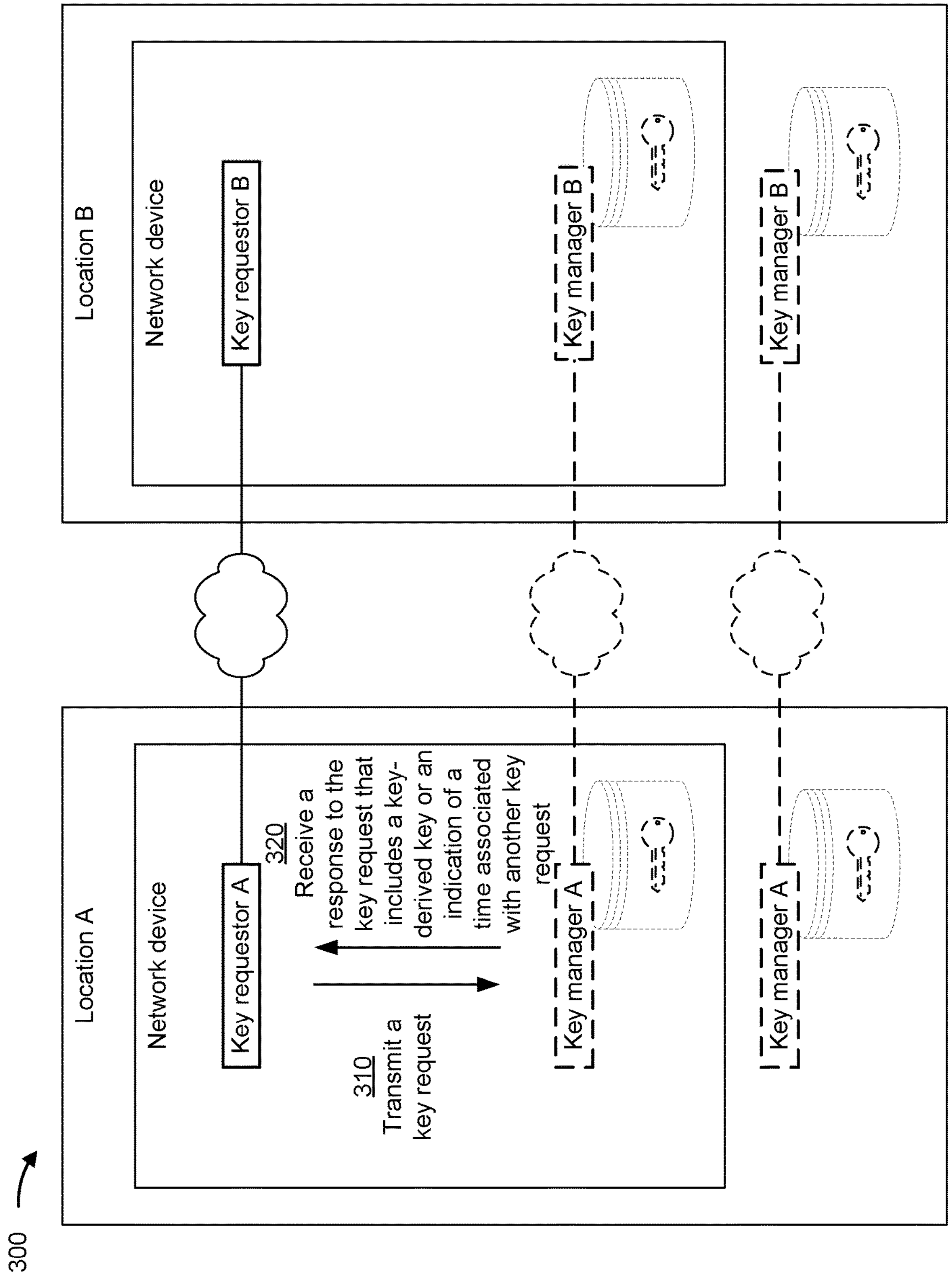
FIG. 3 is a diagram of an example implementation associated with transmission of a key-derived key or an indication of a time associated with a key request.

FIG. 3 is a diagram of an example implementation 300 associated with transmission of a key-derived key or an indication of a time associated with a key request. As shown in FIG. 3, example implementation 300 includes two network devices, which may be the network devices shown in FIG. 1.

As shown by reference number 310, key requestor A may transmit, and key manager A may receive, a key request (e.g., a QKD request). As shown by reference number 320, key manager A may transmit, and key requestor A may receive, a response to the key request. The response to the key request may include a key-derived key or an indication of a time associated with another key request.

In some aspects, the response to the key request may include the key-derived key. For example, a configurable option may be provided whereby, if key manager A is starved of keys and/or raw material, then key manager A may generate one or more keys (e.g., QKD keys) stemming from other keys (e.g., other QKD keys) using a cryptographic key derivation function (KDF). Thus, key manager A may use keys, rather than raw material, to generate additional keys. Upon receiving the key-derived key, the network device (e.g., key requestor A) may use the key-derived key to establish a secure communication with the other network device (e.g., key requestor B).

In some aspects, key manager A may transmit, and the network device (e.g., key requestor A) may receive, an indication that the key-derived key is key-derived. For example, key manager A may transmit a message that informs key requestor A of the nature of the delivered key (e.g., the message may indicate whether the key is generated from raw (e.g., original) material or a KDF). The network device may receive the indication as a key extension object in a key container.

In some aspects, the response to the key request may include the indication of the time associated with the other key request. In some aspects, the time associated with the other key request is a predicted time at which a non-key-derived key will be available. For example, the predicted time may be a time interval after which key requestor A is to re-try transmission of a key request (e.g., by transmitting the other key request. After the predicted time, key manager A may have sufficient raw material to generate the non-key-derived key. Upon receiving the non-key-derived key, the network device (e.g., key requestor A) may use the non-key-derived key to establish a secure communication with the other network device (e.g., key requestor B).

Receiving the key-derived key or the indication of the time associated with the other key request may improve security of communications that are encrypted using the key-derived key and/or reduce overhead due to key requests. For example, receiving the key-derived key from the key manager may enable the key manager to control a level of security of keys used by the key requestor, which may be more secure than relying on a particular implementation of the key requestor to determine the security of the key-derived keys. A key-derived key may carry a different entropy, and may therefore be considered weaker, than a non-key-derived key (e.g., a key generated from raw materials); the key manager may mitigate this weakness by controlling key-derived key provisioning. For example, instead of permitting the key requestor to fall back to a self-generated key, the key manager (rather than the key requestor) may determine whether to allow or disallow use and/or strength of key-derived keys.

Receiving the indication of the time associated with the other key request may reduce overhead, such as bandwidth resources that would, absent the indication of the time associated with the other key request, be occupied with repeatedly transmitted key requests that are rejected due to lack of key material. For example, the indication of time may inform the network device of how long to wait before sending another key request, which may reduce a quantity of key requests sent by the network device.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
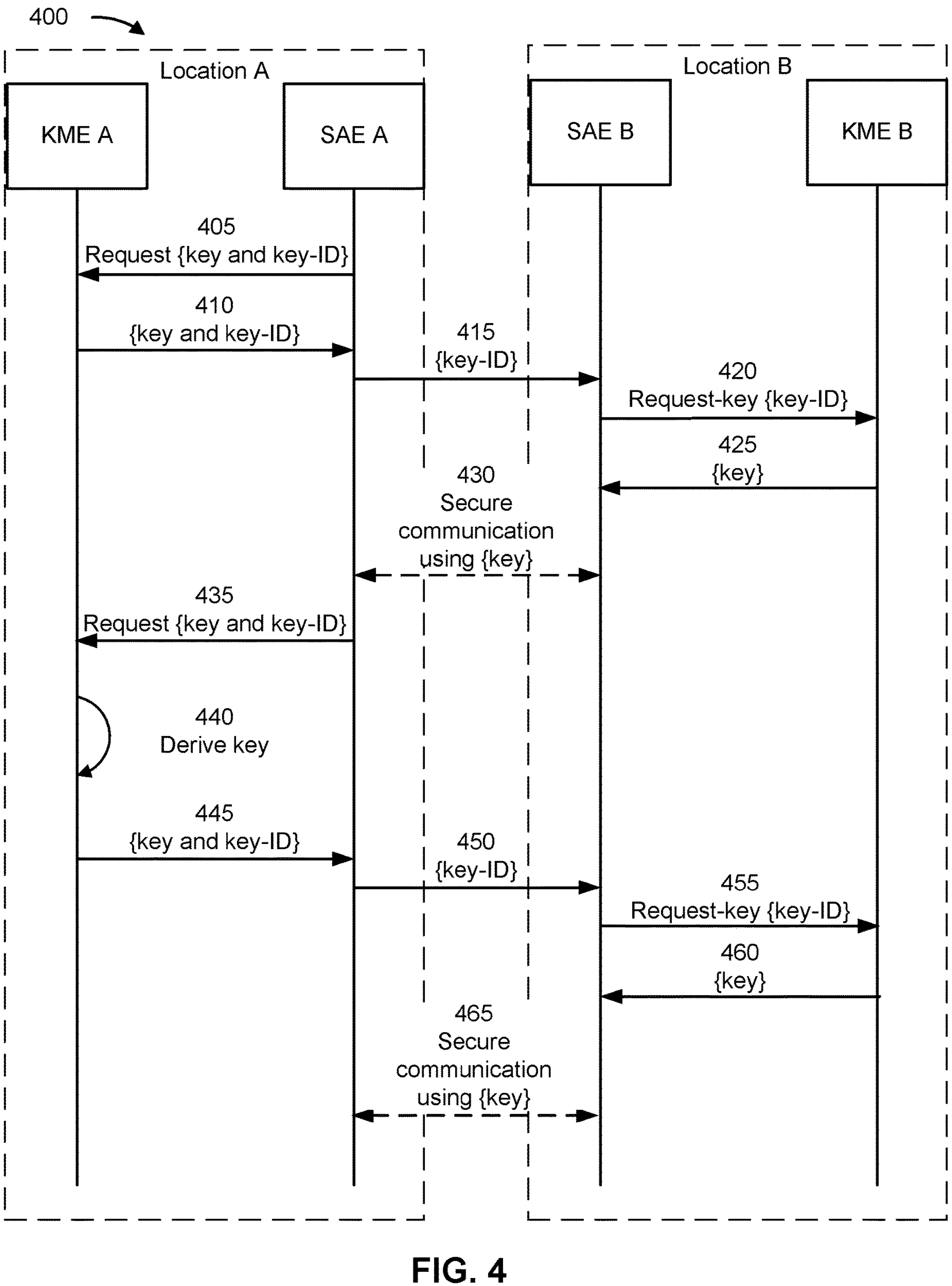
FIG. 4 is a diagram of an example process associated with a message exchange, involving key derivation, during a slow key generation phase.

FIG. 4 is a diagram of an example process 400 associated with a message exchange, involving key derivation, during a slow key generation phase.

As shown by reference number 405, SAE A (e.g., key requestor A) may transmit, and KME A (e.g., key manager A) may receive, a request for a key and a key identifier of the key. KME A may generate the key from raw material. Thus, the key may be a non-key-derived key.

As shown by reference number 410, KME A may transmit, and SAE A may receive, the key and key identifier. As shown by reference number 415, SAE A may transmit, and SAE B may receive, the key identifier. As shown by reference number 420, SAE B may transmit, and KME B may receive, a request for the key. The request for the key may include the key identifier. As shown by reference number 425, KME B may transmit, and SAE B may receive, the key. As shown by reference number 430, SAE A and SAE B may establish a secure communication using the key.

As shown by reference number 435, SAE A may transmit, and KME A may receive, another request for another key and another key identifier of the other key. As shown by reference number 440, KME A may derive the other key from a key (a non-key-derived key). Thus, the other key may be a key-derived key.

As shown by reference number 445, KME A may transmit, and SAE A may receive, the key and key identifier. As shown by reference number 450, SAE A may transmit, and SAE B may receive, the key identifier. As shown by reference number 455, SAE B may transmit, and KME B may receive, a request for the key-derived key. The request for the key-derived key may include the key identifier. As shown by reference number 460, KME B may transmit, and SAE B may receive, the key-derived key. As shown by reference number 465, SAE A and SAE B may establish a secure communication using the key-derived key.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

In some examples (e.g., example implementations 100 and/or 300), a key requestor (e.g., SAE A) may indicate, to a key manager (e.g., KME A) a target length of time for the key requestor to receive a key after transmitting a corresponding key request. For example, the target length of time may be a length of time that the key requestor will wait for a response to a key request. The key requestor may indicate the target length of time while establishing a connection with the key manager and/or with one or more key requests. Additionally, or alternatively, the key manager may indicate, to the key requestor, an expected response time for the key manager or another key manager to provide a key in response to the key request. For example, upon receiving a key request, the key manager may indicate that another key manager is expected to use a given quantity of seconds to deliver the corresponding key.

In some examples, the key requestor may request a key from the key manager, and the key manager may respond based on the target length of time or the expected response time. For example, if the key manager cannot provide a key within the target length of time and/or the expected response time, then the key manager may respond with an error code. The key manager may be unable to provide a key within the target length of time and/or the expected response time due to time associated with the key manager checking whether the key manager can reach one or more other devices involved in key generation (e.g., another key manager, an entropy source, or the like), time associated with a substitute key generation process (e.g., in case the check fails), or the like. If the key manager can provide the key within the target length of time and/or the expected response time, then the key manager may respond with the key. If the key manager determines that another key manager will use more time than the target length of time and/or the expected response time to create and deliver a key, then the key manager may indicate, to the key requestor, not to request a key from the other key manager before a given time window or time of day has expired.

In some examples, the key manager may establish a policy that a key from another key manager can be requested only if the key is not older than a length of time that begins when the key has been requested from the key manager. If the key is older than the length of time, then the key may be discarded. For example, upon request, the key manager may deliver, to the key requestor, the key, an indication that the key is valid for a given quantity of seconds, and an indication that the other key manager is to receive a key request before the given quantity of second expires. For example, the key manager may indicate, to the key requestor, that the key is valid for only the given quantity of seconds, and that if another key requestor does not fetch the key from the other key manager before the given quantity of seconds expires (e.g., if other key manager does not receive a key request before the given quantity of second expires), then the key delivery may fail.

In some examples, the key manager may indicate, to the key requestor, a wait time, which may be a length of time until another key manager will be able to deliver the key. In this example, the key manager may create an exception to the policy that a key from another key manager can be requested only if the key is not older than a length of time that begins when the key has been requested from the key manager. For instance, the key manager may add the wait time to the length of time that begins when the key has been requested from the key manager. In some examples, the key requestor may delay transmission of the key identifier to another key requestor, which may request the key upon receiving the key identifier. In some examples, the key requestor may communicate, to the other key requestor, that the key corresponding to the key identifier should be fetched at a specified time, with a specified delay, and/or before the specified time or the specified delay has elapsed.

In some examples, the key manager may indicate, to the key requestor, a minimum time and a maximum time between which a key is valid, and the key requestor may indicate, to the key manager, the target length of time for the key requestor to receive the key after transmitting a corresponding key request. The indications may be used to fine-tune the cadence associated with a key. For example, if a key manager determines that another key manager has experienced an issue (e.g., a reset), and the key manager receives a key request from a key requestor, then the key manager may wait for an amount of time (e.g., thirty seconds) to respond to the key request by releasing the key. During the amount of time, the other key manager may complete the reset. After the amount of time, the key manager may release the key to the key requestor. Additionally, or alternatively, the key manager may respond to the key requestor (e.g., without waiting for the amount of time) and inform the key requestor that the other key requestor is to request the key after the amount of time.

In some examples, a key manager (e.g., a KME) may receive raw material (e.g., random or pseudorandom numbers) from one or more entropy or key sources and use the raw material to generate one or more keys for delivery to a key requestor (e.g., an SAE). If an entropy or key source slows down or informs the key manager of potential key starvation, similar techniques as those described herein may be applied between the entropy or key source and the KME. For example, the key manager (e.g., KME A) may receive a key request (e.g., from SAE A) and determine whether the entropy or key source(s) (e.g., entropy server(s)) are reachable. In some examples, the key manager may use time to determine that the entropy or key source(s) are not reachable and that the key manager is to create a key without assistance from the entropy or key sources. The key manager may respond to the key request within a target length of time and/or an expected response time and/or delay a key request from another key requestor (e.g., SAE B) to another key manager (e.g., KME B), which may provide the other key manager sufficient time to respond to the key request given that the entropy or key source(s) are not reachable.

Figure 5:
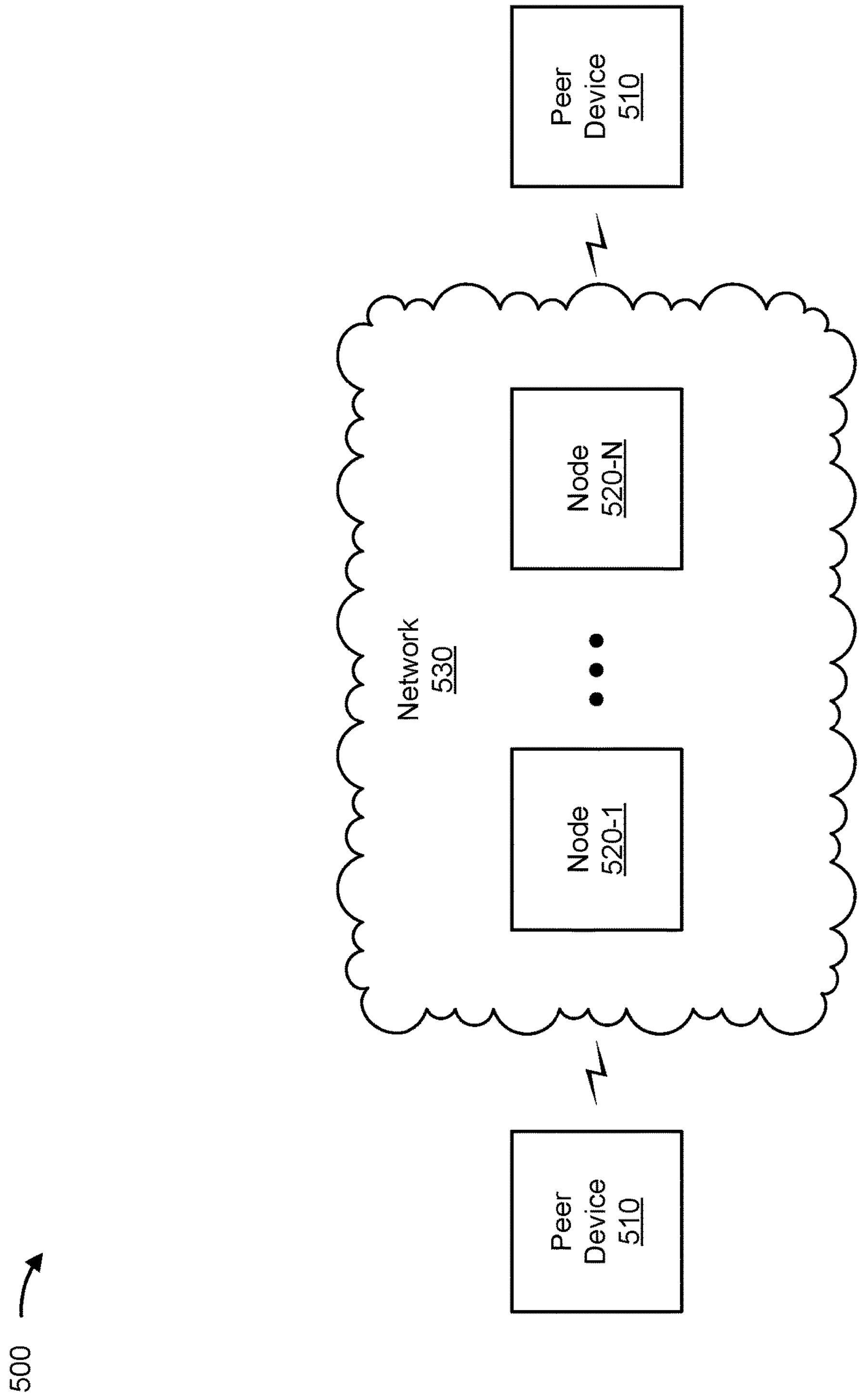
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include one or more peer devices 510, a group of nodes 520 (shown as node 520-1 through node 520-N), and a network 530. Devices of environment 500 may interconnect via wired connections, wireless connections, or a combination of wired and wireless connections.

Peer device 510 includes one or more devices capable of receiving and/or providing network traffic. For example, peer device 510 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. In some implementations, peer device 510 may include an endpoint device that is a source or a destination for network traffic. For example, peer device 510 may include a computer or a similar type of device. Peer device 510 may receive network traffic from and/or may provide network traffic (e.g., payload packets) to other peer devices 510 via network 530 (e.g., by routing payload packets using node(s) 520 as an intermediary). In some implementations, peer device 510 may include an edge device that is located at an edge of one or more networks. For example, peer device 510 may receive network traffic from and/or may provide network traffic (e.g., payload packets) to devices external to network 530.

Node 520 includes one or more devices capable of receiving, processing, storing, routing, and/or providing traffic (e.g., a payload packet, a file, etc.) in a manner described herein. For example, node 520 may include a router, such as a label switching router (LSR), a label edge router (LER), an ingress router, an egress router, a provider router (e.g., a provider edge router, a provider core router, etc.), a virtual router, or another type of router. Additionally, or alternatively, node 520 may include a gateway, a switch, a firewall, a hub, a bridge, a reverse proxy, a server (e.g., a proxy server, a cloud server, a data center server, etc.), a load balancer, and/or a similar device.

In some implementations, node 520 may be a physical device implemented within a housing, such as a chassis. In some implementations, node 520 may be a virtual device implemented by one or more computer devices of a cloud computing environment or a data center.

In some implementations, node 520 may be configured with one or more segment translation tables. In some implementations, node 520 may receive a payload packet from peer device 510. In some implementations, node 520 may encapsulate the payload packet using a compressed routing header (CRH) and may route the internet protocol (IP) payload packet to another node 520, using one or more techniques described elsewhere herein. In some implementations, node 520 may be an edge node in network 530. In some implementations, node 520 may be an intermediary node in network 530 (i.e., a node between two or more edge nodes).

Network 530 includes one or more wired and/or wireless networks. For example, network 530 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as one or more examples. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
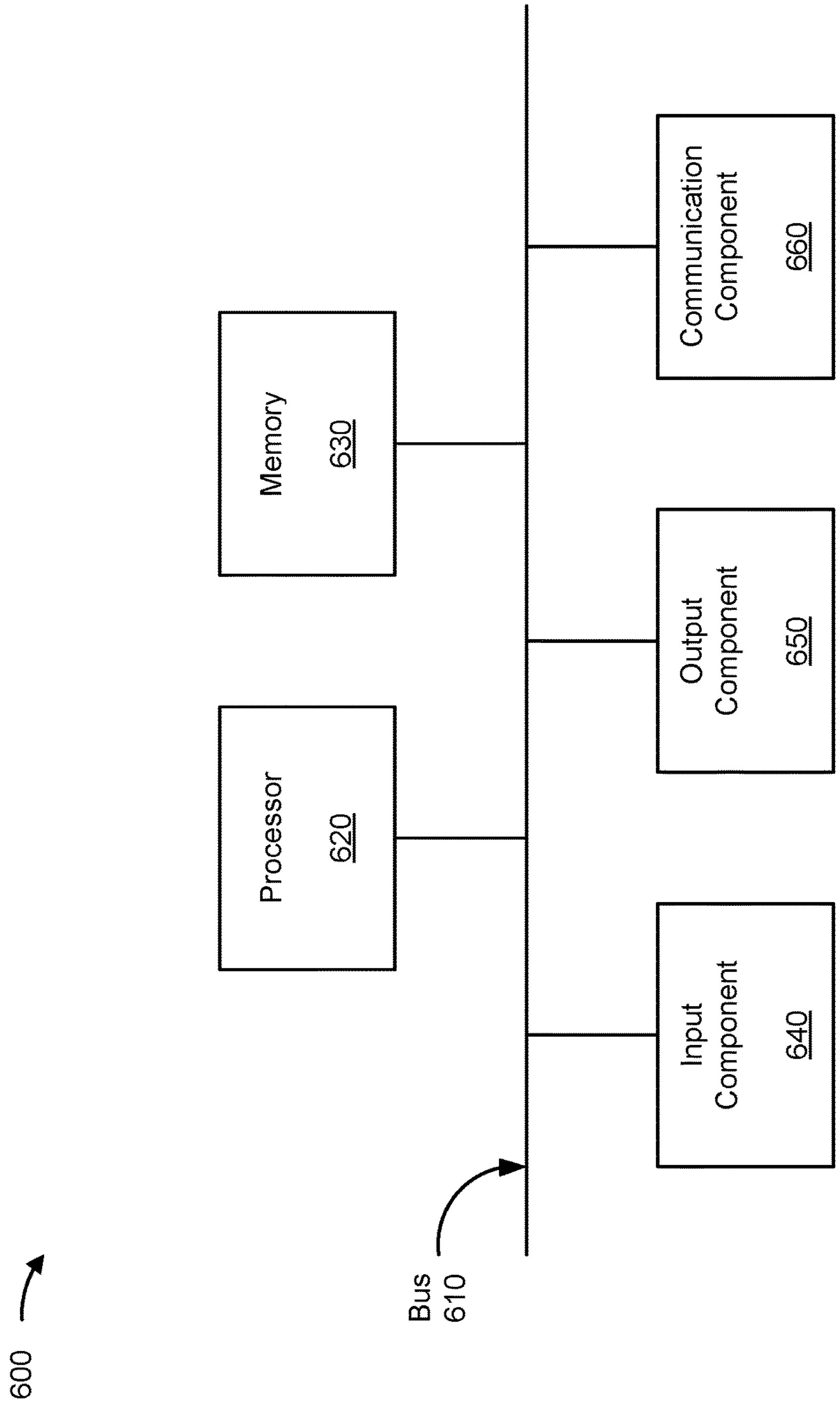
FIG. 6 is a diagram of example components of a device associated with key request management.

FIG. 6 is a diagram of example components of a device 600 associated with key request management. The device 600 may correspond to peer device 510 and/or node 520. In some implementations, peer device 510 and/or node 520 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
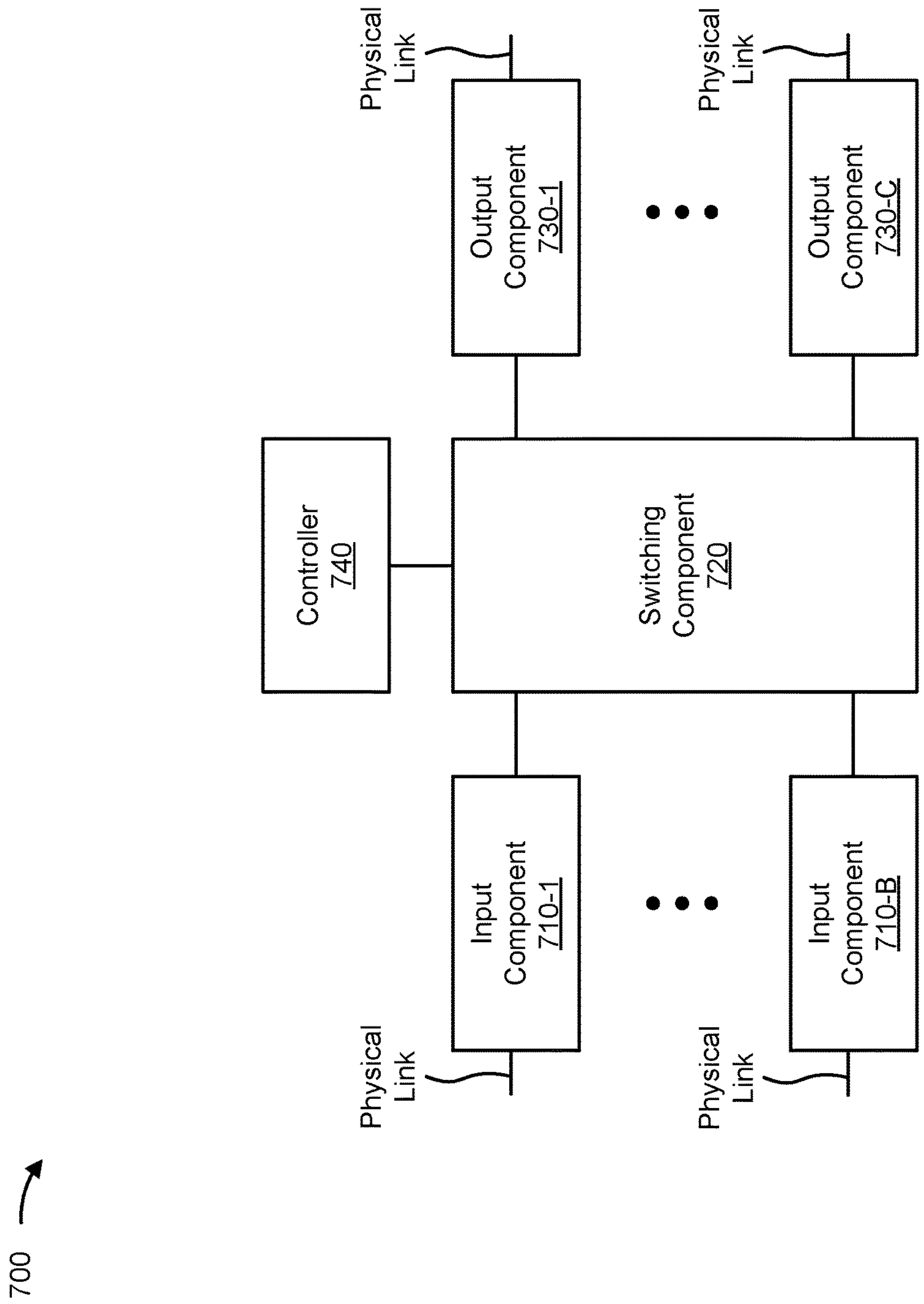
FIG. 7 is a diagram of example components of a device associated with key request management.

FIG. 7 is a diagram of example components of a device 700 associated with key request management. Device 700 may correspond to peer device 510 and/or node 520. In some implementations, peer device 510 and/or node 520 may include one or more devices 700 and/or one or more components of device 700. As shown in FIG. 7, device 700 may include one or more input components 710-1 through 710-B (B≥1) (hereinafter referred to collectively as input components 710, and individually as input component 710), a switching component 720, one or more output components 730-1 through 730-C (C≥1) (hereinafter referred to collectively as output components 730, and individually as output component 730), and a controller 740.

Input component 710 may be one or more points of attachment for physical links and may be one or more points of entry for incoming traffic, such as packets. Input component 710 may process incoming traffic, such as by performing data link layer encapsulation or decapsulation. In some implementations, input component 710 may transmit and/or receive packets. In some implementations, input component 710 may include an input line card that includes one or more packet processing components (e.g., in the form of integrated circuits), such as one or more interface cards (IFCs), packet forwarding components, line card controller components, input ports, processors, memories, and/or input queues. In some implementations, device 700 may include one or more input components 710.

Switching component 720 may interconnect input components 710 with output components 730. In some implementations, switching component 720 may be implemented via one or more crossbars, via busses, and/or with shared memories. The shared memories may act as temporary buffers to store packets from input components 710 before the packets are eventually scheduled for delivery to output components 730. In some implementations, switching component 720 may enable input components 710, output components 730, and/or controller 740 to communicate with one another.

Output component 730 may store packets and may schedule packets for transmission on output physical links. Output component 730 may support data link layer encapsulation or decapsulation, and/or a variety of higher-level protocols. In some implementations, output component 730 may transmit packets and/or receive packets. In some implementations, output component 730 may include an output line card that includes one or more packet processing components (e.g., in the form of integrated circuits), such as one or more IFCs, packet forwarding components, line card controller components, output ports, processors, memories, and/or output queues. In some implementations, device 700 may include one or more output components 730. In some implementations, input component 710 and output component 730 may be implemented by the same set of components (e.g., and input/output component may be a combination of input component 710 and output component 730).

Controller 740 includes a processor in the form of, for example, a central processing unit (CPU), a graphics processing unit (GPU), an accelerated processing unit (APU), a microprocessor, a microcontroller, a digital signal processor (DSP), an field-programmable gate array (FPGA), an application-specific integrated circuit (ASIC), and/or another type of processor. The processor is implemented in hardware, firmware, or a combination of hardware and software. In some implementations, controller 740 may include one or more processors that can be programmed to perform a function.

In some implementations, controller 740 may include a RAM, a ROM, and/or another type of dynamic or static storage device (e.g., a flash memory, a magnetic memory, an optical memory, etc.) that stores information and/or instructions for use by controller 740.

In some implementations, controller 740 may communicate with other devices, networks, and/or systems connected to device 700 to exchange information regarding network topology. Controller 740 may create routing tables based on the network topology information, may create forwarding tables based on the routing tables, and may forward the forwarding tables to input components 710 and/or output components 730. Input components 710 and/or output components 730 may use the forwarding tables to perform route lookups for incoming and/or outgoing packets.

Controller 740 may perform one or more processes described herein. Controller 740 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 740 from another computer-readable medium or from another device via a communication interface. When executed, software instructions stored in a memory and/or storage component associated with controller 740 may cause controller 740 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
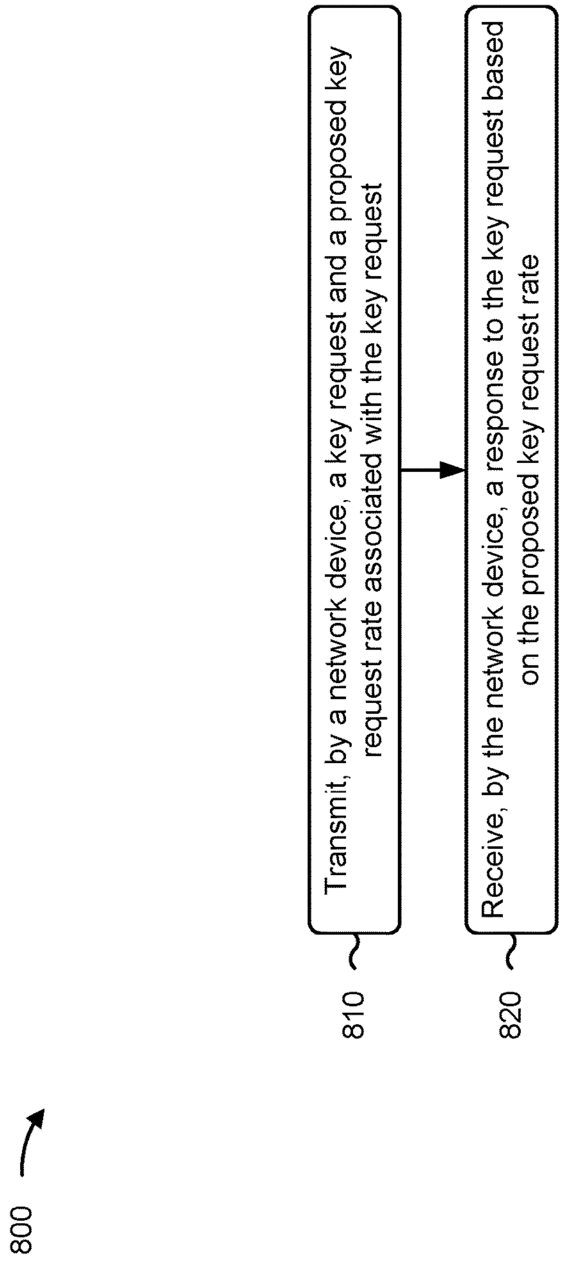
FIG. 8 is a flowchart of an example process associated with key request management.

FIG. 8 is a flowchart of an example process 800 associated with key request management. In some implementations, one or more process blocks of FIG. 8 are performed by a network device (e.g., the network device of FIG. 1). In some implementations, one or more process blocks of FIG. 8 are performed by another device or a group of devices separate from or including the network device, such as a peer device (e.g., peer device 510) and/or a node (e.g., node 520). Additionally, or alternatively, one or more process blocks of FIG. 8 may be performed by one or more components of device 600, such as processor 620, memory 630, input component 640, output component 650, and/or communication component 660. Additionally, or alternatively, one or more process blocks of FIG. 8 may be performed by one or more components of device 600, such as input components 710, switching component 720, output components 730, and/or controller 740.

As shown in FIG. 8, process 800 may include transmitting a key request and a proposed key request rate associated with the key request (block 810). For example, the network device may transmit a key request and a proposed key request rate associated with the key request, as described above.

As further shown in FIG. 8, process 800 may include receiving a response to the key request based on the proposed key request rate (block 820). For example, the network device may receive a response to the key request based on the proposed key request rate, as described above.

Process 800 may include additional implementations, such as any single implementation or any combination of implementations described below and/or in connection with one or more other processes described elsewhere herein.

In a first implementation, process 800 includes receiving, by the network device, an indication of a supported key request rate.

In a second implementation, alone or in combination with the first implementation, the response to the key request is a rejection of the key request, and the rejection of the key request is associated with an alarm.

In a third implementation, alone or in combination with one or more of the first and second implementations, the response to the key request is a rejection of the key request, and process 800 includes transmitting another proposed key request rate that is less than or equal to a supported key request rate.

In a fourth implementation, alone or in combination with one or more of the first through third implementations, the response to the key request is an acceptance of the key request, and process 800 includes transmitting another key request associated with the key request and another proposed key request rate associated with the other key request.

In a fifth implementation, alone or in combination with one or more of the first through fourth implementations, the response to the key request is an acceptance of the key request, and process 800 includes transmitting another key request associated with the key request, and refraining from transmitting another proposed key request rate associated with the other key request.

In a sixth implementation, alone or in combination with one or more of the first through fifth implementations, the proposed key request rate is a proposed key request pace.

In a seventh implementation, alone or in combination with one or more of the first through sixth implementations, the response to the key request is a rejection of the key request, and the rejection of the key request indicates that the rejection of the key request is based on the proposed key request pace.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

transmitting, by a network device, a key request and a proposed key request rate associated with the key request;

receiving, by the network device, a response to the key request based on the proposed key request rate;

generating, by the network device, a key prior to a time period associated with the key request rate;

caching, by the network device, the key prior to the time period expiring;

transmitting, by the network device, a second key request and a second proposed key request rate based on determining that the second proposed key request rate is a different rate from the proposed key request rate, or transmitting, by the network device, the second key request and refraining from transmitting the second proposed key request rate based on determining that the second proposed key request rate is a same rate as the proposed key request rate; and transmitting, by the network device and based on receiving the second key request, the key.

2. The method of claim 1, further comprising:

receiving, by the network device, an indication of a supported key request rate.

3. The method of claim 1, wherein the response to the key request is a rejection of the key request, and wherein the rejection of the key request is associated with an alarm.

4. The method of claim 1, wherein the response to the key request is a rejection of the key request, the method further comprising:

transmitting, by the network device, another proposed key request rate that is less than or equal to a supported key request rate.

5. The method of claim 1, wherein the response to the key request is an acceptance of the key request, the method further comprising:

transmitting, by the network device, an additional key request and an additional proposed key request rate associated with the additional key request.

6. The method of claim 1, wherein the proposed key request rate is a proposed key request pace.

7. The method of claim 6, wherein the response to the key request is a rejection of the key request, and wherein the rejection of the key request indicates that the rejection of the key request is based on the proposed key request pace.

8. The method of claim 1, wherein the response to the key request may include an indication of time associated with an additional key request.

9. The method of claim 8, wherein the indication of time associated with the additional key request is associated with a time interval after which the network device is to re-try transmission of the key request.

10. A non-transitory computer-readable medium storing a set of instructions, the set of instructions comprising:

one or more instructions that, when executed by one or more processors of a network device, cause the network device to:

transmit a quantum key distribution (QKD) key request and a proposed QKD key request rate associated with the QKD key request;

receive a response to the QKD key request based on the proposed QKD key request rate;

generate a QKD key prior to a time period associated with the QKD key request rate;

cache the QKD key prior to the time period expiring;

transmit a second QKD key request and a second proposed QKD key request rate based on determining that the second proposed QKD key request rate is a different rate from the proposed QKD key request rate, or transmit the second QKD key request and refraining from transmitting the second proposed QKD key request rate based on determining that the second proposed QKD key request rate is a same rate as the proposed QKD key request rate; and transmit, based on receiving the second QKD key request, the QKD key.

11. The non-transitory computer-readable medium of claim 10, wherein the one or more instructions further cause the network device to: receive an indication of a supported QKD key request rate.

12. The non-transitory computer-readable medium of claim 10, wherein the response to the QKD key request is a rejection of the QKD key request, and wherein the rejection of the QKD key request is associated with an alarm.

13. The non-transitory computer-readable medium of claim 10, wherein the response to the QKD key request is a rejection of the QKD key request, and wherein the one or more instructions further cause the network device to:

transmit another proposed QKD key request rate that is less than or equal to a supported QKD key request rate.

14. The non-transitory computer-readable medium of claim 10, wherein the response to the key request is an acceptance of the key request, and wherein the one or more instructions further cause the network device to:

transmit an additional QKD key request and an additional proposed QKD key request rate associated with the additional QKD key request.

15. The non-transitory computer-readable medium of claim 10, wherein the proposed QKD key request rate is a proposed QKD key request pace.

16. A device, comprising:

one or more memories; and one or more processors to:

transmit a key request and a proposed key request rate associated with the key request;

receive a response to the key request based on the proposed key request rate;

generate a key prior to a time period associated with the key request rate;

cache the key prior to the time period expiring;

transmit a second key request and a second proposed key request rate based on determining that the second proposed key request rate is a different rate from the proposed key request rate, or transmit the second key request and refraining from transmitting the second proposed key request rate based on determining that the second proposed key request rate is a same rate as the proposed key request rate; and transmit, based on receiving the second key request, the key.

17. The device of claim 16, wherein the one or more processors are to:

receive an indication of a supported key request rate.

18. The device of claim 16, wherein the response to the key request is a rejection of the key request, and wherein the rejection of the key request is associated with an alarm.

19. The device of claim 16, wherein the response to the key request is a rejection of the key request, and wherein the one or more processors are to:

transmit another proposed key request rate that is less than or equal to a supported key request rate.

20. The device of claim 16, wherein the response to the key request is an acceptance of the key request, and wherein the one or more processors are to:

transmit an additional key request and an additional proposed key request rate associated with the additional key request.

* * * * *